United States Patent

[11] 3,612,852

| [72] | Inventor | Armen Bogossian<br>584 Cumberland Ave., Teaneck, N.J.<br>07666 |
|---|---|---|
| [21] | Appl. No. | 827,391 |
| [22] | Filed | May 23, 1969 |
| [45] | Patented | Oct. 12, 1971 |

[54] LEAK-PROOF LIGHT
11 Claims, 5 Drawing Figs.

[52] U.S. Cl.................................................. 240/8.3,
240/90, 277/178
[51] Int. Cl...................................................... B60q 1/26,
B60q 1/44
[50] Field of Search.......................................... 240/8.3,
8.2, 6.4 FE, 90, 7.1 E; 277/178

[56] References Cited
UNITED STATES PATENTS

| 2,219,940 | 10/1940 | Ritz-Woller.................. | 240/8.2 X |
| 2,686,868 | 8/1954 | Diedring....................... | 240/8.3 X |
| 2,719,967 | 10/1955 | Donley......................... | 240/8.2 X |
| 3,046,388 | 7/1962 | Shinn............................ | 240/8.3 |
| 3,100,085 | 8/1963 | Dover........................... | 240/90 X |

*Primary Examiner*—Louis R. Prince
*Assistant Examiner*—Daniel M. Yasich
*Attorney*—Alfred W. Vibber ABSTRACT: A leak-proof light adapted to use, for example, on a vehicle. A gasket between the mating flanged surfaces of the lens and the casing and an elastomeric tube for the electrical conduit in an aperture in the rear of the casing keep the light sealed against the intrusion of water despite its submersion in water to a considerable depth. The elastomeric tube is expanded by an internal sleeve member seating the tube against the aperture of the casing. The light incorporates a vibration-cushioning mount for the electric lamp mounting means that is part of the elastomeric tube which seals the electric cable to the housing of the light.

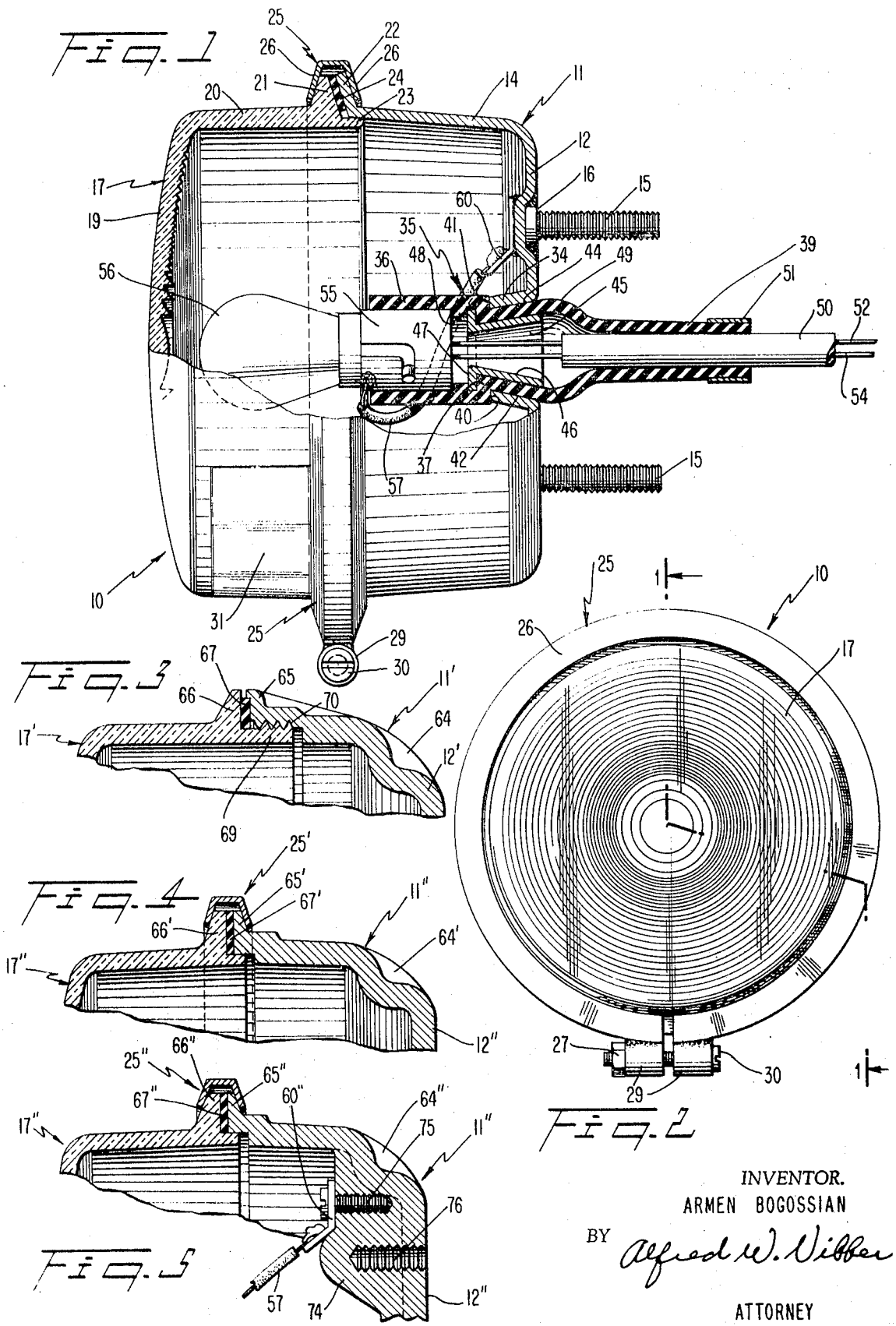

LEAK-PROOF LIGHT

This invention relates to a leak-proof light, and more particularly to a light adapted for use on a vehicle. The light illustrated herein is adapted to be employed as a tail and stop light for a boat trailer, in connection with which it will primarily be discussed herein, although it is obviously useful for a wide variety of other purposes.

Tail and stoplights in use on boat trailers today usually have drain holes in the lower portion of the light housing, and the lens is not water sealed to the housing. The makers of such lights suggest the disconnection of the light energizing cable from the towing vehicle, so that the bulb or bulbs of the trailer tail and stoplights are not hot when the rear end of the trailer is immersed in water as the trailer is backed down the boat launching ramp. This precaution is frequently overlooked by boat operators eager to launch their boats. After retrieving the boat, the operator may easily forget to reconnect the trailer light cable to the power source of the towing vehicle, thereby endangering himself and others on the road and also subjecting him to possible arrest for driving without proper lights.

The drain holes in the light housing, and the lack of a watertight seal between the lens and the housing, as well as the launching and the retrieval of a boat allow the complete saturation of the light housing, the light bulb, and the light socket with salt or fresh water. Upon the energization of the light circuit, electrolysis begins immediately; such electrolysis is particularly marked in a salt water environment. The resulting high-contact resistance at the bulb socket contacts results in heating which accelerates bulb burnout and/or short circuits; the latter condition adversely affects the electrical system of the towing vehicle.

Not only does the provision of drain holes in the light housing allow the entry of water into the light housing, but it also permits air and other gases to enter and to carry into the housing particles of foreign material such as dust and dirt. After the liquid has drained from the housing, much of the foreign material remains therein; some of such material inevitably remains on the light bulb, lens, and reflector. Consequently, there is a drastic reduction in the light emitted through the lens after appreciable use of the light.

Another source of difficulty with trailer tail and stop light bulbs is the vibration to which they are subjected as the trailer travels over the highway. Light sockets are at times rigidly affixed to the light housing. Such sockets will bounce or vibrate at the same frequency as the frame of the trailer to which they are attached. The amplitude of such vibration is increased by the distance of the light from the wheels of the trailer from the trailer hitch pivot point. Vehicle bulbs with standard filaments cannot survive for extended periods the damaging vibrations they encounter in trailer use, particularly when they are frequently subjected to temperature shock.

It is among the objects of the present invention to provide a leak-proof light which is particularly characterized by its simplicity, ruggedness, and economy of manufacture and maintenance.

A further object of the invention is the provision of a leak-proof light which safely withstands submersion in liquids to appreciable depths.

Another object of the invention is the provision of a light adapted for use on a vehicle wherein the light bulb socket is mounted in a cushioning mount whereby it is protected from damage by vibrations transmitted to the light housing by the frame of the vehicle.

A still further object of the invention is the provision of a light of the character described immediately above wherein the cushioning mount for the lamp socket forms a part of a means for sealing the lamp bulb energizing cable to the housing of the light.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view partially in side elevation and partially in vertical axial section of an illustrative light in accordance with the invention, the section being taken along the broken section line 1—1 of FIG. 2;

FIG. 2 is a view in front elevation of the light of FIG. 1;

FIG. 3 is a fragmentary view in vertical axial section through a second embodiment of light in accordance with the invention;

FIG. 4 is a similar view of a third embodiment of light in accordance with the invention; and FIG. 5 is a fragmentary view in vertical axial section through the light of FIG. 4 but with such light having been turned somewhat about its axis.

As is apparent from the above, three embodiments of the light of the invention are shown herein, the first being shown in FIGS. 1 and 2, the second in FIG. 3, and the third in FIGS. 4 and 5. The second and third embodiments of the light differ from the first embodiment primarily in that the body of the light in the first embodiment is made of pressed metal, whereas that of the second and third embodiments are made of cast metal. Other differences between the embodiments are the provision of heat dissipating fins in the second and third embodiments, the use of different means to attach the light to a support such as a vehicle frame, and the means for securing and sealing the lens of the light to the body or housing thereof.

The light of FIGS. 1 and 2 is generally designated by the reference character 10. Such light has a cuplike body 11 which is made of pressed or drawn metal, such body having a rear end wall 12 and a sidewall 14 of frustoconical shape. The light is adapted to be mounted upon a support by means of mounting bolts 15 which project rearwardly from the wall 12 of the body, the bolts being secured to the body by having their heads welded to the wall 12 at depressions therein as shown at 16. A cuplike lens body 17 has a forward transverse end 19 which forms the lens of the light. The lens body has a slightly tapered but substantially circular cylindrical sidewall 20 which is preferably made of red material such as plastic, as is the lens 19. The lens body has an annular radially outwardly converging V-shaped flange 21 which cooperates with a radially outwardly flared flange 22 on the forward end of the sidewall 14 of the light body to effect a seal between such parts through the medium of a frustoconical gasket 24. The radially inner rear edge of the wall 20 of the lens body is provided with an annular pilot portion 23 which telescopes accurately within the forward end of the wall 14 of the body 11. The lens body and the body of the light are forcibly pulled together in an axial direction by a clamping ring 25 which is of broad V-cross section and has opposite diverging sides 26 which engage the surfaces of the flanges 21 and 22. The clamping ring 25 is forcibly contracted by a conventional means which includes a boss 29 on each end of the ring, the bosses having aligned passage therethrough freely receiving a machine screw 30 having a nut 27 thereon, as shown. Upon the tightening of the screw, the ring 25 is placed under very substantial tension thereby to insure a seal between the parts 11 and 17.

In the embodiment shown the light is adapted for use on the rear end of a boat trailer. In such use it functions as a taillight, as a stoplight, and as a license plate illuminating means. The first and third functions are performed by one filament of the light bulb whereas the second function is performed by another filament thereof. The lens body 17 has a clear part annular portion 31 through which the license plate of a vehicle is illuminated. Portion 31 may be made separate from the lens body 17 and connected to the body as by being cemented or heat sealed thereto; alternatively portion 31 may be made integral with the remainder of the lens body, all of the lens body being internally painted red with the exception of the portion 31.

Parts of the light thus far described insure the sealing thereof at the joint between the light body 11 and the lens body 17. There remains, however, the sealing of the opening through the wall 12 of the light body through which the light bulb is energized. The sealing of the light at such location is effected as follows. The rear wall 12 of the light body is provided with a shallowly axially inwardly converging frustoconical sleeve 34. An elastomeric tube or sleeve 35 of stepped construction has the forward larger diametered circular cylindrical portion 36 thereof disposed within the cavity in the light casing and the rear smaller diametered portion 39 extending rearwardly within the sleeve 34 and outwardly therebeyond. The joint between the zones 36 and 39 of the member 35 is in the form of a transverse annular flange or step, the rear transverse annular surface 40 of the step 37 being in sealing engagement with the forward transverse annular surface 41 of sleeve 34, and the inner surface 42 of such sleeve being sealingly engaged by the outer surface 44 of the forward portion of member 39. Such portions of the member 35 are maintained in the described relationship by means of a deformed metal outlet wedge sleeve 45 having a sleeve portion 46 and a flange portion 47 which forcibly engage the inner surface of the part of the tube 35 within the sleeve 34 and the forward surface of the step 37.

The frustoconical configuration of the sleeves 34 and 46 and the compression to which they subject the portion of the tube 35 between them causes the tube immediately to the rear thereof to bulge to form a "boot" 49 which is disposed radially outwardly of the conduit 50. This renders the seal flexible and prevents the wires 52, 54 of the conduit from being subjected to undue tension as the conduit is bent relatively to the light.

The sheath of the conduit 50 preferably terminates within the boot 49 so as to leave the wires 52, 54 free to flex. Wire 52, for example, may be the wire which energizes the stoplight filament of the light bulb 56 whereas wire 54 is then the wire which energizes the filament of the light bulb functioning as a taillight and to illuminate the license plate. In order to prevent the intrusion of water between the portion 39 of the tube 35 and the sheath of the conduit 50, an annular compression clamp 51 is provided adjacent the rear end of the tube portion 39 in order sealingly to compress such portion against the sheath of the cable.

The light is provided with a lamp socket 55 having a metal shell functioning as a ground connection, the shell 55 being connected to the casing 11 of the lamp by a flexible ground wire 57 which is welded or soldered to the portion of the shell of the socket forwardly of the portion 36 of the tube 35 and extends to a ground clip 60 which is welded at 61 to the rear wall 12 of the body of the light. It will be apparent that the socket 55 and the bulb 56 carried thereby are supported in the light only by the portion 36 of the tube 35. The socket is preferably spaced substantially from the flange 47 of the wedge sleeve 45 by an annular rib 48 internally of tube 35 so that such portion of the sleeve may flex and thus insulate the socket and bulb from vibrations. Preferably the axial length of the rib 48, that is, the length of the portion 36 of the tube between the rear end of the socket and the flange 47 on the wedge tube, as well as the mass of the socket and bulb, are calculated to offer a desired dampened vibratory action of the bulb in order to limit acceleration and vibration of the socket and bulb to a satisfactory working limit.

The parts of the conduit seal shown in FIG. 1 and above described may be assembled by first inserting the portion 39 of the tube 35 through the sleeve 34 in a rearward direction. Following this the wedge sleeve 45, with the portion 46 thereof initially of circular cylindrical configuration, is inserted within the portion 36 of the tube 35, likewise in a rearward direction. A suitable sleeve expanding tool is then inserted through the portion 39 of the tube 35 in a forward direction so as to expand the sleeve 46 into the frustoconical shape shown, the flange 47 of the wedge sleeve being backed up by a suitable anvil member during such operation. Following the deformation of the sleeve 46 the anvil and the expanding tool are withdrawn from the tube 35 following which the conduit 50 is threaded through the tube 35, the wires 52, 54 are connected to the socket 55, and the socket and conduit are then pulled rearwardly into the position shown in FIG. 1.

The embodiment of FIG. 3 has the parts thereof which are similar to those of FIGS. 1 and 2 designated by the same reference characters with an added prime. The body 11' in such embodiment is made by casting, and the walls thereof are substantially thicker than those of the first embodiment. A plurality of angularly spaced heat dissipating ribs or fins 64 are disposed about the periphery of the light body. The forward end of the body is provided with an annular flange 65 between which and the confronting annular flange 66 on the lens body 17' there is disposed an annular gasket 67. The parts 11' and 17' are retained in securely sealed relationship by a threaded connection 70 between a rearwardly directed sleeve portion 69 on the lens body 17' and the forward end of the light body. The flange 65 is provided with an annular recess which receives the gasket 67, thereby preventing the outward extrusion of the gasket upon the tightening of the lens on the body 11'.

In the embodiment of FIGS. 4 and 5 elements which are the same as those in FIGS. 3 are designated by the same reference characters with an added prime. In this construction the body 11" is also made of cast metal and is provided with heat dissipating fins 64". The fins 64", however, are present only on the intermediate and rear portions of the periphery of the body 11". The lens body 17" is secured and sealed to the light body 11" by a split ring 25" which is similar to ring 25 of the first embodiment. A plurality of thickened portions 74 in the form of internal bosses are provided on the rear wall 12" of the light casing, such bosses permitting the attachment to the casing of a ground clip 60" by a machine screw 75 which is screwed into a blind hole in a boss 74. Further blind holes 76 in such bosses, which are open rearwardly and are tapped, permit the use of machine screws extending through the frame of a vehicle or other support (not shown) to support the light without piercing the walls of the light casing.

Although as indicated the light of the invention may be used for a wide number of purposes, it displays perhaps its maximum advantages when employed as the taillight on a boat trailer. Such taillights are usually completely immersed in water while energized, since the stoplight is on when the trailer is backed down the launching ramp into the water. Upon being immersed in the water the hot lamp is suddenly cooled and a negative pressure is built up in the lamp casing, thereby tending to draw water into the unit. With the completely sealed lamp of the invention negative pressure poses no problem. The lamp is assembled under normal atmospheric conditions. Energization of the lamp bulb creates a positive pressure within the lamp casing. Sudden cooling of the lamp decreases the temperature and the pressure within it quite suddenly; the seals between the lens and the lamp casing and between the lamp casing and the conduit are such as to withstand very substantial negative pressures without the leakage of water into the casing even under abnormal conditions. The casing of the lamp is preferably made of metal or plastic having high-heat conductivity so that heat is readily dissipated from the lamp whether it is operating in a liquid or a gas. A suitable metal for the casing is, for example, aluminum, which has a high-heat conductivity. Many plastics also fall into this category. The fins on the casing in the embodiments of FIGS. 3–5, inclusive, also aids greatly in the dissipation of heat.

The lights of the invention may be used on devices other than marine equipment, and are particularly useful where the light is continuously exposed to very humid atmospheres. Thus the light could be used on tractors, trailers, vehicles requiring explosion proof wiring, earth movers, and so forth. Its positive sealing means makes it useful wherever explosions could occur. Thus it is advantageously used for deck and mast lights of oil tankers, on overland oil carriers as a tail or marker light, as well as on equipment used in mines having possible explosive gaseous atmospheres.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus the body or housing of the light of the invention may be made of plastic material rather than metal, a separate wire in conduit 50 then being provided for the ground connection to the light socket. It is also to be understood that conduit 50 may enter the casing of the light at locations other than the center of the rear wall of the casing. For example, conduit 50 may enter the casing through the periphery of the casing, where it is sealed thereto by the conduit sealing means shown and claimed herein.

I claim:

1. A sealed electric light comprising a casing having a lens sealed thereto, a socket adapted to receive a light bulb disposed within the casing, an electrical conduit extending into the casing through an opening in the wall thereof for energizing the light bulb, and means sealing the conduit to the casing comprising an elastomeric tube telescoped over and sealingly engaging the conduit, said tube extending through the opening in the casing and being sealed to the wall of the casing at said opening, the means sealing the conduit to the casing comprises means within the elastomeric tube in the zone thereof passing through the opening in the wall of the casing which expands the tube into sealing engagement with the confronting surface of the wall of the casing at said opening, the casing having a first sleeve secured to the wall of the casing surrounding the opening therein, the means which expands the tube being a second sleeve disposed therewithin radially inwardly of the first sleeve.

2. A light according to claim 1, wherein the first sleeve extends into the casing from the wall thereof.

3. A light according to claim 2, wherein the first and second sleeves are of tapered shape and converge in a direction inwardly of the casing.

4. A light according to claim 3, wherein the axially outer portion of the tube closely embraces the conduit, and comprising annular clamp means axially outwardly of the boot for compressing the tube into sealing engagement with the conduit, the first and second tapered sleeves forming a flexible boot in the portion of the tube immediately outwardly of the wall of the casing through which the tube passes.

5. A light according to claim 2, wherein the tube has a first, smaller diametered axially outer portion, and a second, larger diametered axially inner portion, said two portions being joined by a transverse annular step, and the second sleeve has a radially outwardly directed annular flange on its axially inner end, the axially outer and inner surfaces of the step being in sealing engagement with the flange on the second sleeve and the axially inner end of the first sleeve.

6. A light according to claim 5, wherein the socket is telescoped within the tube and lies a substantial distance axially inwardly of the wall of the casing through which the tube extends whereby the tube supports the socket and light bulb and cushions then against vibration.

7. A light according to claim 6, comprising means within the tube and secured to the inner wall thereof engaging the socket to position it at a predetermined distance from the said wall of the casing.

8. A light according to claim 1, wherein the socket is mounted upon the axially inner end of the tube.

9. A light according to claim 8, wherein the casing is made of metal, the socket has a metal shell, and comprising a flexible ground wire connected between the metal shell of the socket inwardly of the inner end of the tube and the casing.

10. A sealed electric light comprising a casing having a lens sealed thereto, a socket adapted to receive a light bulb disposed within the casing, an electrical conduit extending into the casing through an opening in the wall thereof for energizing the light bulb, means sealing the conduit to the casing comprising an elastomeric tube telescoped over the conduit, extending through the opening in the casing, and sealed to the wall of the casing at said opening, the lens being sealed to the casing by means comprising an annular radially outwardly extending flange on the lens, an annular radially outwardly extending flange on the forward end of the casing, the two flanges being disposed coaxially and having their confronting surfaces lying on similar parallel cones of large apex angle having their apices lying on the common axis of the two flanges, a frustoconical gasket disposed between the confronting surfaces of the flanges, and means for thrusting the lens and casing toward each other along the axis of the flanges.

11. A sealed electric light comprising a casing having imperforate side and rear walls, and an imperforate lens sealed to the forward end of the casing, the lens being sealed to the casing by means comprising an annular radially outwardly extending flange on the lens, an annular radially outwardly extending flange on the forward end of the casing, the two flanges being disposed coaxially and having their confronting surfaces lying on similar parallel cones of large apex angle having their apices lying on the common axis of the two flanges, a frustoconical gasket disposed between the confronting surfaces of the flanges, means for thrusting the lens and casing toward each other along the axis of the flanges, the annular surfaces of said two flanges which are remote from each other being oppositely inclined and converging in a radially outward direction, the means for thrusting the lens and casing toward each other comprising a split ring having a generally V cross section, the ring having opposite annular sides overlying the respective remote surfaces of the annular flanges, and means to pull the opposite ends of the split ring together.